UNITED STATES PATENT OFFICE.

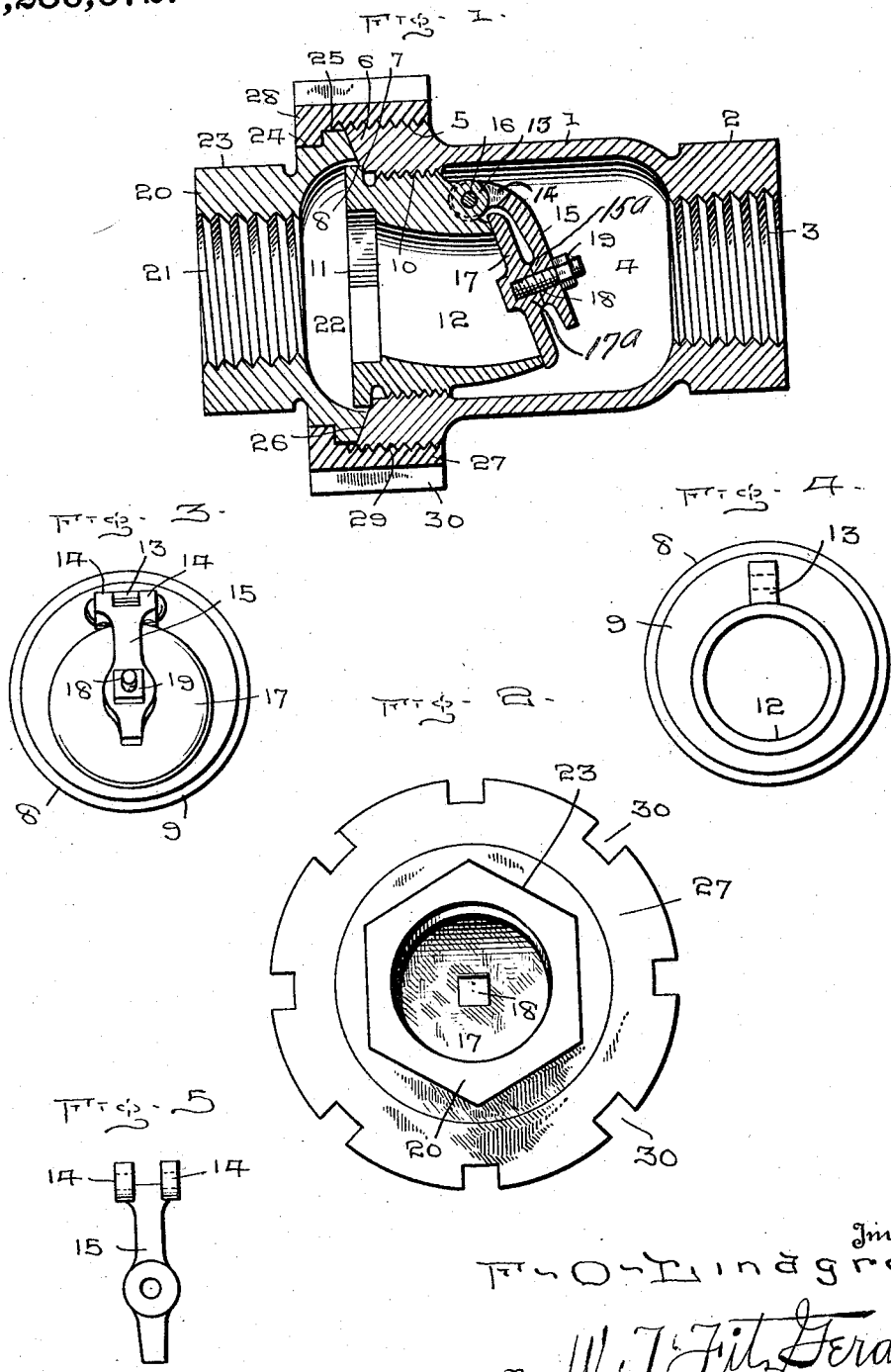
F. O. LINDGREN.
UNION CHECK VALVE.
APPLICATION FILED DEC. 16, 1916.
1,286,672.
Patented Dec. 3, 1918.

FRED O. LINDGREN, OF RIDGWAY, PENNSYLVANIA.

UNION CHECK-VALVE.

1,286,672.

Specification of Letters Patent.

Patented Dec. 3, 1918.

Application filed December 16, 1916. Serial No. 137,361.

*To all whom it may concern:*

Be it known that I, FRED O. LINDGREN, a citizen of the United States, residing at Ridgway, in the county of Elk and State of Pennsylvania, have invented certain new and useful Improvements in Union Check-Valves; and I do hereby declare the following to be a full, clear, and exact description of the invention, such as will enable others skilled in the art to which it appertains to make and use the same.

This invention relates to a union check valve, and has for its principal object to improve and simplify the construction of a valve of this character so that it will be of durable and substantial design, and of comparatively inexpensive construction.

Another object of the invention is to provide a union check valve in which the valve seat can be readily and quickly removed in order that the same may be reground to provide a new check valve seat.

A further object of the invention is to provide a valve seat proper with an opening the same diameter as the opening through the first and second member of the valve, whereby a direct flow of water the full size of the pipe to which the valve is connected, may freely flow through the valve.

A still further object of the invention is the provision of a valve of the above stated character embodying a valve seat, and a check valve pivotally supported upon the valve seat and rotatably mounted on its support, whereby the valve may be rotated at will in order to effectively coöperate with the valve seat to prevent leakage therebetween.

With these and other objects in view, as will appear as the description proceeds, the invention comprises the various novel features of construction, combination and arrangement of parts as will be more fully described hereinafter and set forth with particularity in the appended claim.

Referring to the drawings,

Figure 1 is a vertical horizontal sectional view through my improved union check valve.

Fig. 2 is an end elevation thereof.

Fig. 3 is an end elevation of the valve seat, showing the check valve arranged in operative position.

Fig. 4 is an end view of the valve seat with the check valve removed; and

Fig. 5 is an end elevation of the check valve hinge strap.

Similar characters of reference are used to denote like parts throughout the accompanying drawings and the following description.

Referring more particularly to the drawings, the reference numeral 1 indicates a member of my improved union check valve and has the outer free end formed externally into hexagonal shapes as indicated by the reference numeral 2, whereby a wrench may be applied to hold the member in assembling the device. This outer end of the member is threaded internally as indicated at 3 and communicates with the interior 4, while the opposite end of the member is enlarged circumferentially and formed with external threads 5. The end edge of this end is inclined radially inwardly as indicated by the reference numeral 6, a shoulder 7 being formed in the inner circumferential edge of the member and against which is designed to rest the circumferential flange 8 of the valve seat 9, which latter is provided with external threads 10 whereby the valve seat may be threadedly connected within the inner end of the member. This valve seat 9 is provided in its outer end with a non-square recess 11 in which a suitable tool may be inserted in order to screw the valve seat in the member 1 or remove it therefrom as may be desired. This valve seat 9 is further provided with an opening 12 that is of the same diameter as the threaded opening 3 in the outer end of the member 1 and extends entirely through the valve seat.

The inner end of the valve seat 9 is provided on its outer circumferential surface with an upstanding apertured lug 13, which is embraced by the arms 14 of a bifurcated end of a hinge strap 15, a suitable hinge pin 16 passing through the arms 14 and the lug 13, whereby the hinge strap may have a free swinging movement. The outer end of the hinge strap is formed with an apertured boss 15$^a$. A rotatable check valve 17 is provided centrally on opposite sides with bosses which form a central hub 17$^a$ to which is attached the lower end of the hinge strap 15 through the medium of a threaded stud 18 that is anchored within the hub 17$^a$ of the check valve and extends through the boss 15$^a$ and the lower end of the hinge strap 15, the outer end of this bolt being provided with a nut 19 whereby the check valve may be rotated and then clamped in the desired rotated position. From this construction it will be apparent that when the lower portion of the check valve 17 becomes worn, so as to ineffectively close the opening 12 from the valve seat 9, it can be readily rotated and then adjusted in this rotated position so as to present an unworn surface at the lower portion of the opening 12, thus making it possible to cause the check valve to wear evenly around its circumferential edge.

When it is found necessary to grind the valve seat and the co-engaging surface of the check valve so as to form a perfect seal between the valve and its seat, the co-engaging faces of the valve hub and the boss $15^a$ may be likewise ground so as to permit the boss $15^a$ to bear evenly on the valve hub after it has been ground and arranged in operative position. Therefore it will be seen that the change of the angular relation of the valve with respect to its seat and the boss $15^a$ with respect to the valve hub $17^a$ will be compensated for by the grinding of the co-engaging faces of the hub and boss $15^a$.

By threadedly connecting the valve seat 9 within the inner end of the member 1 it will be apparent that it can be readily removed so that the check valve seat can be ground or the check valve replaced as the case may be in a very ready and quick manner, and then replaced without the necessity of producing an entire new union valve. By the provision of the circumferential flange 8, it will be apparent that it is possible to insert a tool in a non-square recess 11 and screw the valve seat inwardly of the member so as to cause the flange 8 to engage the shoulder 7 in order to form a hermetical seal between the valve seat and the member.

Coöperating with the inner end of the member 1 is a second member 20 which is provided in its outer end with an internally threaded opening 21 that communicates with the internally outwardly flared opening 22 in the opposite end of the second member. The outer end of the second member is formed hexagonally circumferential whereby a suitable tool may be used to hold the member in assembling the device. This second member 20 is provided circumferentially and adjacent the hexagonal end 23 with a shoulder 24 which is disposed directly behind a circumferential flange 25 formed on the inner end of the second member. The inner end edge of the second member is beveled radially outwardly as indicated by numeral 26 and is designed to engage and coöperate with the inwardly beveled or inclined end edge of the member 1.

In order to hold and retain the second member in engagement with the member 1 I employ a union sleeve 27, that is provided at one end with an internally projecting flange 28 that is designed to engage behind the circumferential flange 25 and rest upon the shoulder 24 of the second member. The opposite end of the union sleeve is provided with an internally threaded opening 29, which is of a diameter slightly larger than the diameter of the opening formed by the internally projecting flange 28, so that the sleeve may be threadedly connected on to the external threads 5 of the member 1. By rotating and securing the union sleeve 27 upon the first member, it will be manifest that the inner end edge of the second member will be drawn into close contact with the inner end edge of the first member, thus completely housing the valve seat 9 within the first and second members.

In order to facilitate the easy and ready rotation of the union sleeve 27 I provide recesses 30 in the outer circumferential edge of the sleeve, whereby a spanner wrench or any other suitable tool may be inserted to effectively rotate the sleeve.

While I have shown the beveled face or end edge of the second member engaging the beveled end edge of the first member, I desire to have it understood that if desired a suitable backing may be introduced between these end edges of the first and second members in order to provide a better joint therebetween.

Claim:

A union check valve for a single pipe line having the same diameter throughout comprising a pair of enlarged tubular abutting members having their outer ends internally threaded for the reception of the ends of the pipe line sections, a union sleeve encircling and threadedly connecting said tubular abutting members, a tubular valve seat threaded into the inner end and projecting into one of said pair of tubular members and having an inside diameter the same as the inside diameter of the pipe line whereby the direct flow of fluid can pass through the union check valve, a hinge strap pivotally connected to the valve seat at a point removed from its inner end, and a check valve rotatably supported by said hinge strap to bear against the inner end of said valve seat and close the passage therethrough.

In testimony whereof I have signed my name to this specification in the presence of two subscribing witnesses.

FRED O. LINDGREN.

Witnesses:
J. N. TROXELL,
J. M. HANSCOM.